United States Patent
Pohutsky et al.

(10) Patent No.: US 6,788,927 B2
(45) Date of Patent: Sep. 7, 2004

(54) FINANCING PARTY PAYMENT FOR CALLS WITH A WIRELESS SUBSCRIBER

(75) Inventors: Joseph Pohutsky, Annapolis, MD (US); Alan Perunovich, Millersville, MD (US); Scott R. Trichon, Sykesville, MD (US); Timothy J. Lorello, Gambrills, MD (US)

(73) Assignee: TeleCommunication Systems Inc., Annapolis, MD (US)

( * ) Notice: Subject to any disclaimer, the term of this patent is extended or adjusted under 35 U.S.C. 154(b) by 0 days.

(21) Appl. No.: 10/253,704

(22) Filed: Sep. 25, 2002

(65) Prior Publication Data

US 2004/0058670 A1 Mar. 25, 2004

(51) Int. Cl.⁷ .................... H04M 11/00; H04M 15/00
(52) U.S. Cl. .................... 455/406; 455/405; 455/408; 379/114.01; 379/114.21; 379/114.26; 379/114.28
(58) Field of Search .................... 455/405, 406, 455/408; 379/114.01, 114.1, 114.21, 114.25, 114.26, 114.28

(56) References Cited

U.S. PATENT DOCUMENTS

| | | | | | |
|---|---|---|---|---|---|
| 5,359,642 | A | * | 10/1994 | Castro | 379/121.01 |
| 5,774,533 | A | * | 6/1998 | Patel | 379/127.03 |
| 6,169,891 | B1 | * | 1/2001 | Gorham et al. | 455/408 |
| 6,188,752 | B1 | * | 2/2001 | Lesley | 379/114.16 |
| 6,397,055 | B1 | * | 5/2002 | McHenry et al. | 455/408 |
| 6,442,257 | B1 | * | 8/2002 | Gundlach | 379/114.01 |
| 6,735,291 | B1 | * | 5/2004 | Schmid et al. | 379/189 |
| 2001/0040949 | A1 | * | 11/2001 | Blonder et al. | 379/144.01 |
| 2002/0103762 | A1 | * | 8/2002 | Lopez et al. | 705/63 |

* cited by examiner

Primary Examiner—Vivian Chin
Assistant Examiner—Raymond B. Persino
(74) Attorney, Agent, or Firm—William H. Bollman (57) ABSTRACT

A telecommunication call service is provided that directs incoming and/or outgoing cellular call charges to be billed to another payment party when placed to a telephone number specified by the payment party. The payment party has pre-established a list of telephone numbers with call direction authorized to be placed with the wireless number and identifies payment means in a payment account to be directly debited by the financed payment manager application for the authorized wireless calls. In an exemplary embodiment of the invention, an originating telephone switch detecting a specific prepaid wireless subscriber/other party telephone number pair directs the call to an Integrated Service Control Point (ISCP) for call handling under the financed payment service feature. The ISCP checks the validity of the feature for the prepaid wireless subscriber/ other number pair, authorized direction of the call with respect to the wireless number and verifies a valid payment method in the payment party account to determine whether or not to complete the call. The intelligent network service checks are performed without an interactive communication set-up procedure and all billing, in the event the call is completed, is accomplished without other network communication or outside billing solutions.

26 Claims, 4 Drawing Sheets

500

| | Financing Phone Number | Financed Phone Number | Direction |
|---|---|---|---|
| 502 → | (202) 555-1234 | (410) 123-4567 | Incoming |
| 504 → | (202) 555-1234 | (801) 333-3333 | Outgoing |
| 505 → | (201) 654 3210 | (410) 123-4567 | Both |
| | ⋮ | ⋮ | ⋮ |

| Financing Phone Number | Financed Phone Number | Direction |
|---|---|---|
| (202) 555-1234 | (410) 123-4567 | Incoming |
| (202) 555-1234 | (801) 333-3333 | Outgoing |
| (201) 654 3210 | (410) 123-4567 | Both |
| ⋮ | ⋮ | ⋮ |

510 — Financing Phone Number
512 — Financed Phone Number
514 — Direction
502 → row 1
504 → row 2
505 → row 3

FINANCING PARTY PAYMENT FOR CALLS WITH A WIRELESS SUBSCRIBER

The Applicants hereby claim priority from U.S. patent application Ser. No. 09/988,186, entitled "Financing Party Payment for Calls with a Wireless Subscriber," filed on Nov. 19, 2001, the entirety of which is expressly incorporated herein by reference.

BACKGROUND OF THE INVENTION

1. Field of the Invention

The present invention relates generally to telecommunication networks. More particularly, the present invention relates to a method for a financing party to pay for wireless telephone services and charges related to calls made with a particular subscriber.

2. Background of Related Art

Throughout the 1990's, cellular telephones and other wireless products have emerged as a must-have item among mobile professionals and consumers alike and have been growing in popularity every year since cellular telephones were first introduced in 1983. Their widespread use for both voice and data communications is largely due to the significant progress that has been made in their portability, the availability of network services and the declining cost for equipment and services. Wireless phones were originally targeted at mobile professionals enabling them to optimize their schedules by turning non-productive driving and out-of-office time into productive work time. Today wireless service is also targeted at the casual telephone user providing them with the convenience of anytime-anywhere calling plus the security of instant access to service in times of emergency.

However, extensive use of wireless service can become expensive. For instance, airtime charges may accrue for each incoming and outgoing call. To reduce some expenses, cellular telephone users, e.g., may turn their wireless phone off, and/or may choose to limit outgoing calls to minimize airtime charges and any long distance call toll charges. Unfortunately, the desire to reduce charges may cause a user to feel reluctant to use a wireless phone. This cost conscious approach to wireless service tends to reduce the intended freedom of wireless communications.

The present invention recognizes that there are instances when a wireless user would desire to communicate with a selected party willing to pay all charges related to the call but not for all other calls and/or charges on the wireless phone. For example, a family member would like the ability to place or receive calls with a college bound daughter; likewise, an employee would appreciate an employer's direct payment for business related calls placed on the employee's telephone, rather than reimbursement after the fact.

Service providers offer several well known long distance calling plans including collect calls, calling cards and prepaid cards. Unfortunately, these current calling plans typically require time consuming and potentially annoying user interactive communication set-up procedures to, e.g., identify the method of payment to authorize a particular call, e.g., a collect call or calling card call. For instance, the calling party may have forgotten the preferred access number and method for placing a collect call, or a calling card number and required PIN, information which is necessary to enable the call. Moreover, calling cards and prepaid calls require infusion of funds by a cash-strapped subscriber, and collect calls nevertheless still charge the cash-strapped subscriber for airtime.

U.S. Pat. No. 6,169,891 to Gorham et al. provides a method and apparatus for charging airtime costs for a receiving (not calling) wireless phone to another account. However, Gorham et al. fails to eliminate charges for such a wireless phone when calling, much less when calling a particular number (e.g., a child on a wireless phone calling a parent while away at school).

U.S. Pat. No. 5,774,533 to Patel discloses a method and system for a wireless subscriber to bill another phone for calls made on a per-communication basis. However, Patel relates to long distance type charges, and not to airtime charges.

While such payment services are advantageous, they nevertheless result in an incomplete patchwork solution for a wireless subscriber to direct costs associated with the wireless service. For instance, for outgoing wireless calls, conventional long distance services are currently set-up to handle long distance charges, but not the associated airtime of a called or calling subscriber. Moreover, the disbursement of costs for wireless calls are complicated by user interactive communication set-up procedures.

There is a need for a telecommunications system that simplifies billing for call service features, allows for full cost disbursement, and that does not require an interactive communication set-up procedure between the call originator and the service provider on a call-by-call basis.

SUMMARY OF THE INVENTION

In accordance with the principles of the present invention, a database to allow a financing party to a phone call the automatic ability to pay charges of another party associated with said phone call comprises a plurality of financing party phone numbers each associated with a different financing party. One or more financed party phone numbers is associated with each of the plurality of financing party phone numbers. Call charges associated with a call between any one of the plurality of financing party phone numbers and any of the one or more financed party phone numbers associated therewith are assigned to the one of the plurality of financing party phone numbers without requiring real time user input by the financed party.

A method of allowing a first party to a telephone call to pre-establish authorization for payment of charges associated with a second party to said telephone call in accordance with another aspect of the present invention comprises establishing a database associating the first party with the second party with respect to pre-established authorization for payment of the second party's call charges by the first party. The second party's call charges with respect to only the telephone call are automatically assigned to the first party after a call between the first party and the second party has been terminated.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

A new call service is provided which allows a party to a phone call with a wireless subscriber to pay all charges associated with the call, including the wireless subscriber's airtime.

In preferred embodiments, an Advanced Information Network is used to automatically identify, process and bill or debit a designated party for calls with one or more selected wireless subscribers, either within or outside their provider's network. An Integrated Service Control Point is configured and programmed for application within an intelligent network to automatically detect and screen for a financed call service feature to authorize particular wireless connections, without requiring an interactive, call-by-call set-up procedure.

In accordance with the principles of the present invention, the financed call services feature may be implemented with otherwise complete billing using pre-established credit or prepaid accounts, thus eliminating a dependence on external network nodes to provide billing records, bill transfers and/or preparation of consolidated billing statements.

Figure 1:
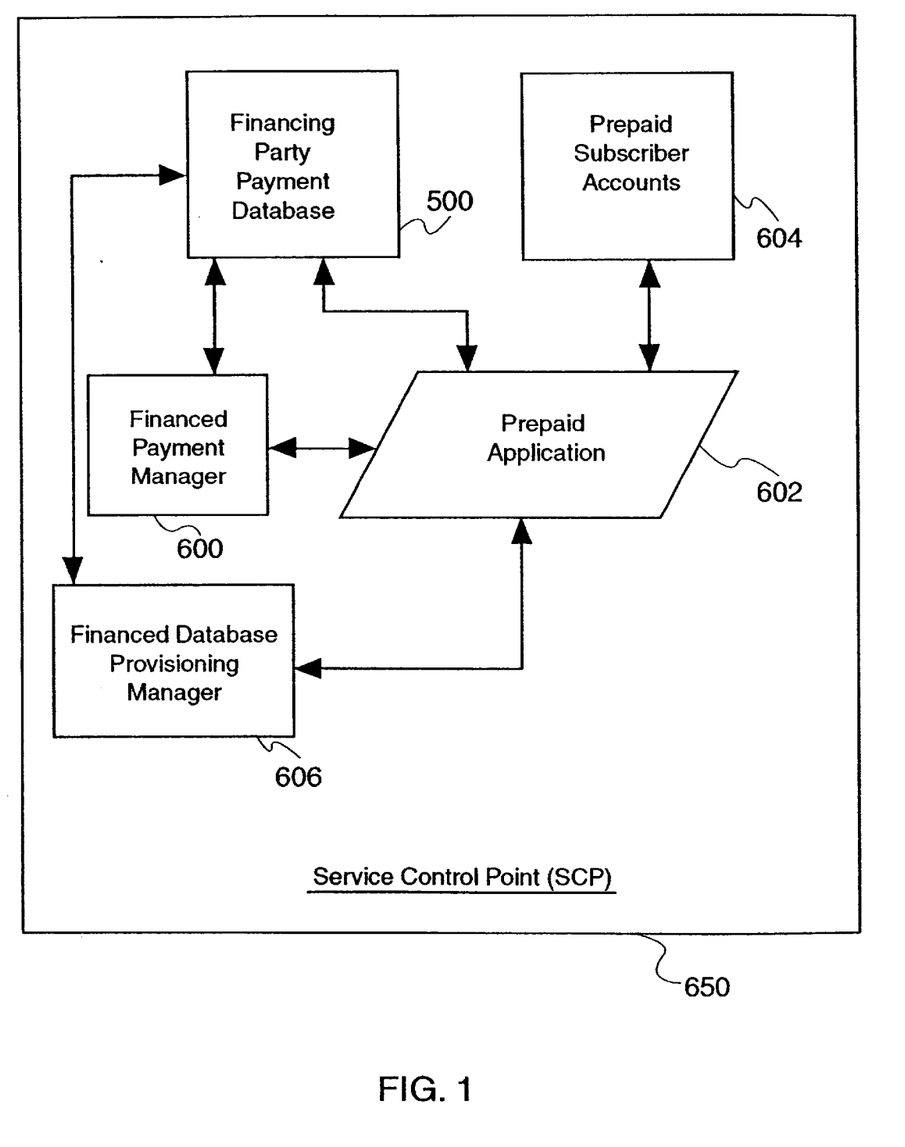
FIG. 1 depicts a prepaid application in a wireless network including a financing party payment database and financed payment manager, in accordance with the principles of the present invention.

FIG. 1 depicts a prepaid application in a Service Control Point (SCP) of a wireless network including a financing party payment database and financed payment manager, in accordance with the principles of the present invention.

In particular, as shown in FIG. 1, a Service Control Point (e.g., an Integrated Service Control Point) 650 includes a prepaid application 602 including a database of prepaid subscriber accounts 604. The prepaid application may be, e.g., as shown and described in co-pending U.S. application Ser. No. 09/533,805, filed Mar. 23, 2000, the entirety of which is explicitly incorporated herein by reference.

The SCP 650 includes a financed payment manager 600, financing party payment database 500, and a financed database provisioning manager 606. While the financed payment elements 600, 500, 606 are shown separately in FIG. 1 for ease of description, they may be (and preferably are) incorporated into a common software application.

The financed payment manager 600 provides the functionality of recognizing calls between prepaid subscribers maintained in the common prepaid subscriber accounts 604, and associates payment of the wireless subscriber's airtime and toll charges obligations to another prepaid subscriber in accordance with a match found in the financing party payment database 500.

The financed database provisioning manager 606 is preferably a WINDOWS™ based user interface allowing a service provider to manipulate entries in the financing party payment database 500. While the disclosed embodiments relate to provisioning provided by a service provider, the principles of the present invention relate equally to automated provisioning by the financing party themselves.

The service provider, in addition to main application access and system downloads, may configure a Web site resident on the Web server to provide password protected Internet access to the call services by the prepaid subscriber. Internet access as well as other means of account access through a landline telephone, modem or wireless telephone and personal digital assistant are well known in the art.

For instance, the provisioning manager 606 may be a web-based system wherein the user accesses a web page inputs relevant phone number and payment information to establish or adjust one or more entries in the financing party payment database 500. Alternatively, the provisioning manager may audibly prompt the financing party over a telephone, and the user may input particular information using the keys of a DTMF keypad on their touch tone telephone.

Figure 2:
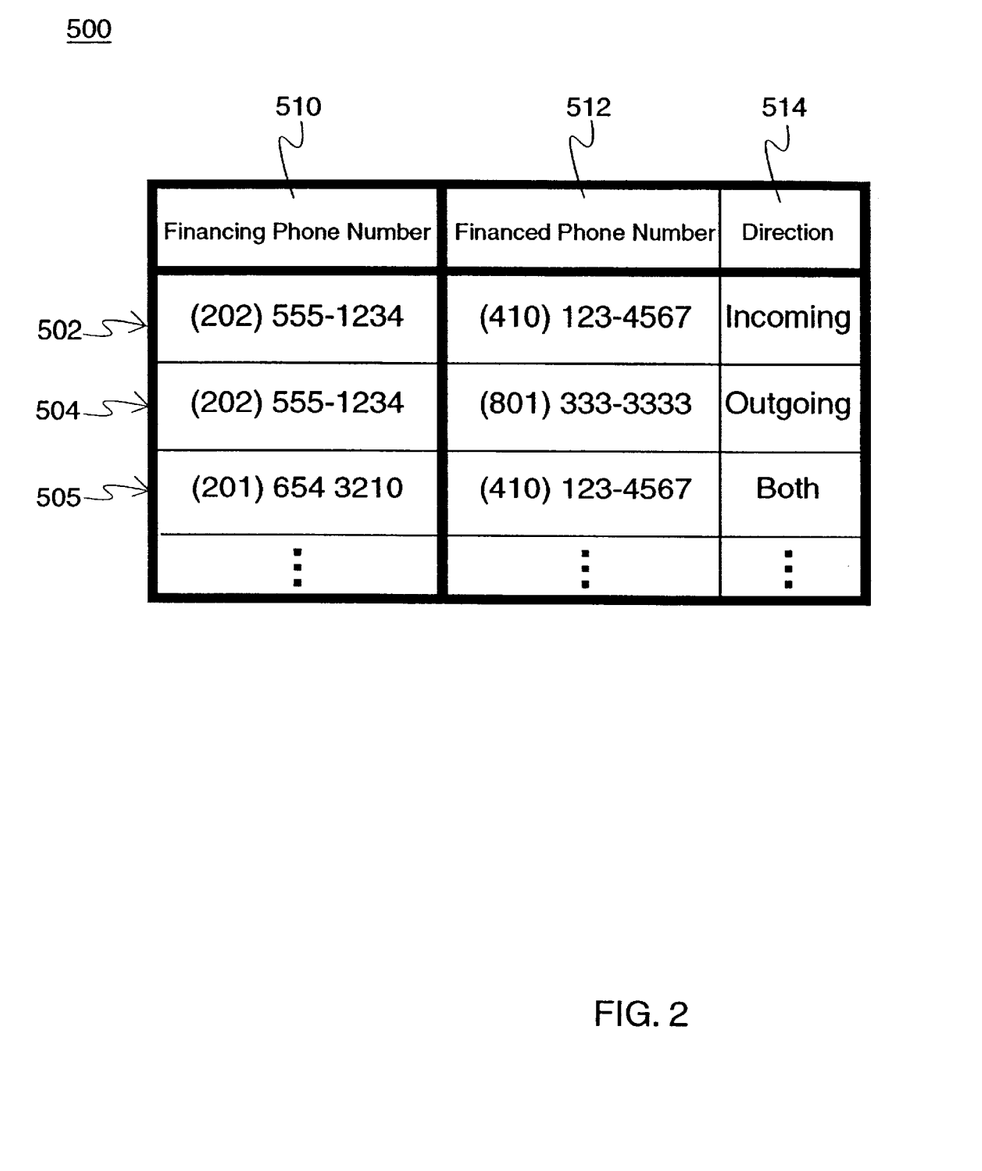
FIG. 2 shows an exemplary financing party payment database shown in FIG. 1.

FIG. 2 shows an exemplary financing party payment database shown in FIG. 1.

In particular, as shown in FIG. 2, the financing party payment database includes a plurality of entries 502–505 each representing a wireless subscriber and the prepaid account which will be responsible for payment of all charges relating to calls between that wireless subscriber and the phone of the responsible party.

Each entry 502–505 includes an indication of the relevant wireless subscriber whose charges are to be paid 512 (e.g., by phone number or mobile ID number (MIN)), and an indication of the relevant financing party 510, be it another wireless subscriber or a landline telephone. In any event, in the disclosed embodiments, both the financing and financed party maintain prepaid accounts in the prepaid application 602.

Optional additional parameters may be included in any or all entries 502–505 of the financing party payment database 500. For instance payment of phone calls from a particular wireless subscriber may be limited to phone calls in a singular direction only as provided by the Direction parameter 514 as shown in FIG. 2 (e.g., "incoming", "outgoing", or "both directions", with respect to a financing party).

The financing party payment database 500 allows a financing party to a phone call the automatic ability to pay charges of another party associated with the phone call include paying for roaming charges.

Note that while the disclosed embodiments implement third party payment call service features in conjunction with a prepaid application, the present invention relates equally to use with a different wireless network feature, and/or stand-alone use separate from a prepaid application.

Figure 3:
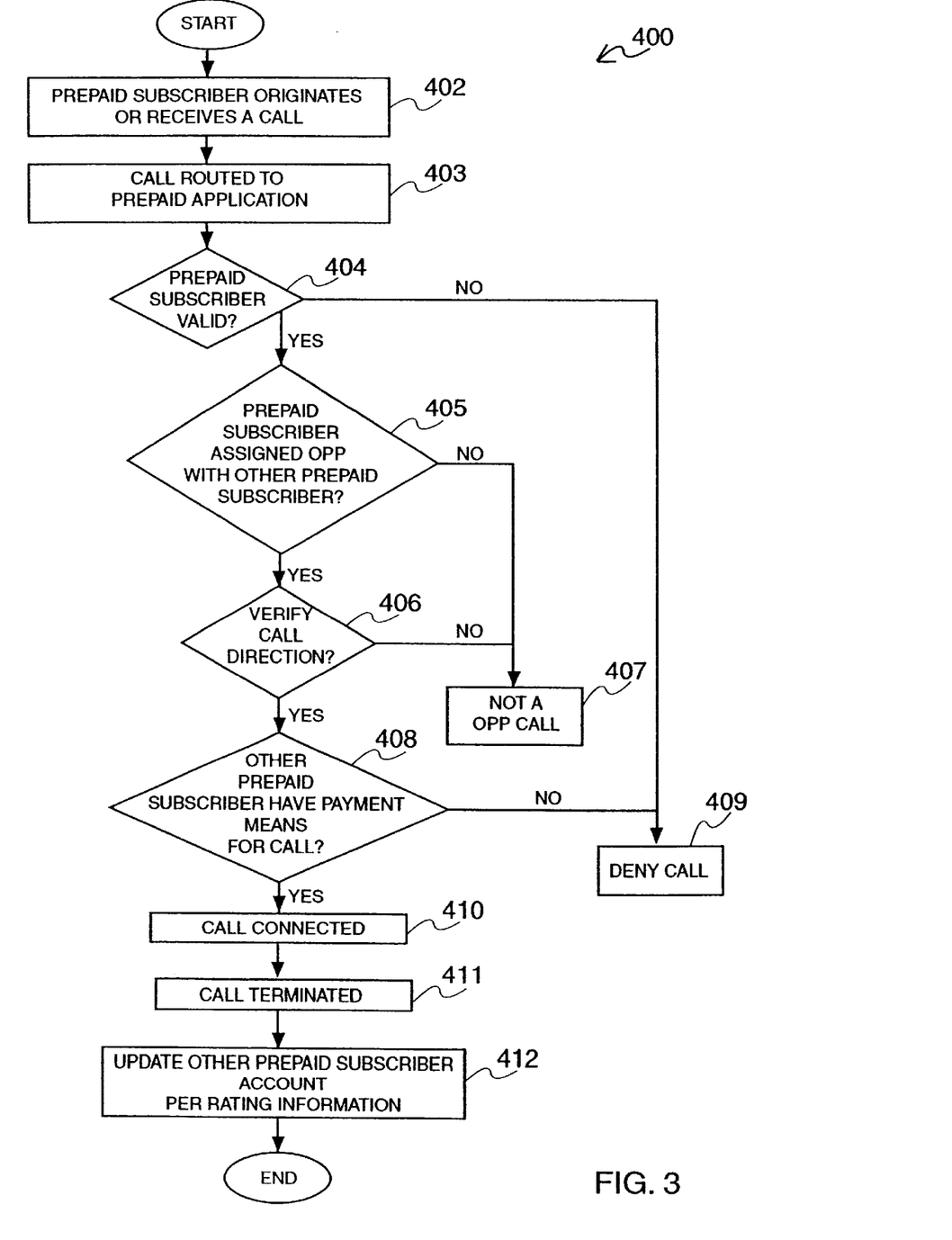
FIG. 3 shows a flow diagram of the call process in accordance with the preferred embodiment of the invention.

FIG. 3 shows a flow diagram of an exemplary call process relating to financed wireless service payments, in accordance with the preferred embodiments of the invention.

In particular, in step 402 of FIG. 3, a financed prepaid (wireless) subscriber originates or receives a call.

In step 403, the originating local switch, whether a Mobile Switching Center (MSC) or a Service Switching Point (SPP) of the relevant service provider, recognizes the caller/called telephone number pair and directs the call to an apparent terminating switch, i.e., to the prepaid application 602 operating in the Service Control Point (SCP), e.g., an Integrated SCP (ISCP) 650 of the service provider.

In step 404, the financed payment manager portion 600 of the prepaid application 602 verifies that the wireless subscriber is valid, i.e., that they have an account in the prepaid subscriber accounts 604. In the disclosed embodiments, both the financed subscriber and the financing subscriber have accounts in relevant features (e.g., Prepaid Account) in the SCP 650 of the relevant provider. If the wireless subscriber is not valid, the call is denied in step 409 in an otherwise conventional fashion, e.g., with a "fast busy" returned to the caller.

In step 405, the prepaid wireless subscriber's telephone number (i.e., their MIN) is checked for a match against all entries 502–505 in the financing party payment database 500, to determine if they are a participant in the financing party payment features of the present invention.

If the subscriber is not a participant in the financed payment manager feature, the SCP 650 passes the call on for other call connection and call service decisions in step 407 as not being a financed call.

In step 406, the call is checked for the call direction with respect to the wireless prepaid subscriber.

In step 407, if the call is not direction validated (i.e., it is outside the authorized financed direction), the call is determined to be not authorized for financing by another subscriber. At this point, it is preferably considered for further connection (e.g., for full payment by the wireless subscriber) in an otherwise conventional fashion.

In step 408, a direction validated call is further checked to determine if the other prepaid subscriber or payment prepaid subscriber has provided sufficiently for call payment, e.g., has sufficient funds in their subscriber account by way of a debit or credit card or a prepaid account to cover the call. If the prepaid account of the financing subscriber is to be funded with a credit card, the credit card billing would preferably be authorized beforehand through the ISCP Internet connection or other methods well known in the art.

In step 410, the call is connected, the call proceeds in an otherwise conventional fashion, and in step 411 the call is terminated.

In step 412, the ISCP notes call termination, computes and directly bills the financing prepaid subscriber in accordance with a class of service defined for the call.

Figure 4:
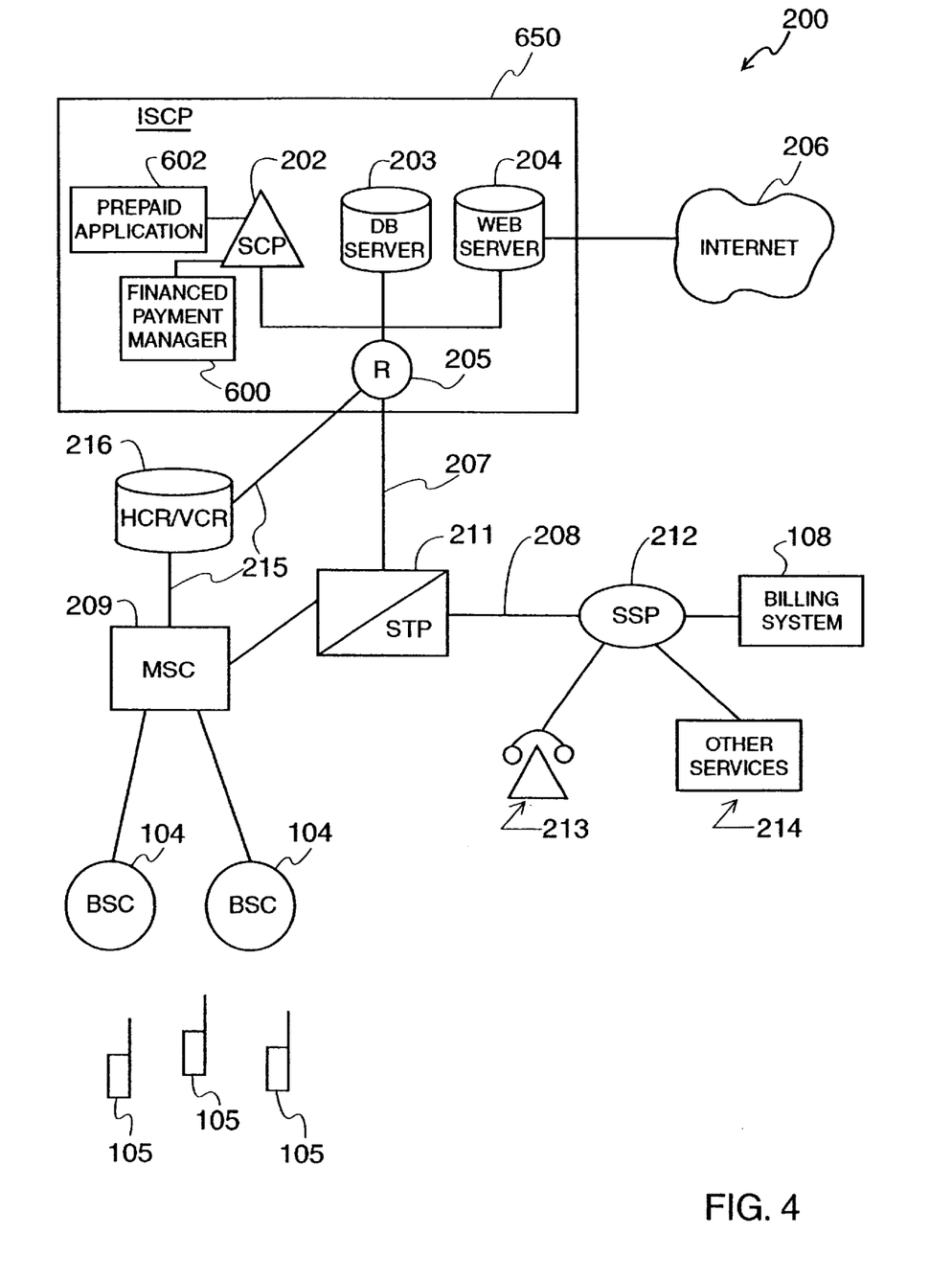
FIG. 4 shows a block diagram of an exemplary telecommunications intelligent network including a prepaid application supporting a financed payment manager, in accordance with the principles of the present invention.

FIG. 4 shows a block diagram of an exemplary telecommunications intelligent network including a prepaid application supporting a financed payment manager, in accordance with the principles of the present invention.

In particular, as shown in FIG. 4, an Advanced Intelligent Network implements call service features allowing automatic payment by third parties.

As shown in FIG. 4, an Integrated SCP (ISCP) 650 comprises several elements connected in a Local area Network (LAN) including an SCP 202 with redundant backup, a database server 203 including the financing party payment database 500. The ISCP 650 operates with or without a database within the SCP 202 to quickly handle large amounts of subscriber data and service feature logic. A Web server 204 (e.g., a wireless Internet gateway such as the one shown and described in co-pending U.S. application Ser. No. 09/630,762, filed Aug. 2, 2000, entitled "Wireless Internet Gateway", the entirety of which is explicitly incorporated herein by reference) provides the ISCP 650 access to the Internet 206.

A router 205 connects the ISCP LAN with the AIN at one or several STPs 211, and/or to a Home Location Register/Visitor Location Register (HLR/VLR) 216 supporting the MSC 209. Other elements may be included on the ISCP LAN to facilitate other functions such as a maintenance port, modem or local workstation, as is well known in the art.

In the disclosed embodiment, the third party payment calling feature utilizes SS7 signaling protocols using ISUP trunk setup and release type messages rather than the TCAP query and response message format.

In particular, in systems that normally utilize TCAP, the originating SSP (e.g., 212) would communicate with the SCP 202 via an STP 211 to obtain call processing data including the interaction messages necessary between the SCP 202 and the calling party required for calling card type call services. Additional codes in the message format may be used to trigger special call services requested from and governed by the SCP 202. The ISCP 650 of the inventive calling feature appears as a terminating switch that would normally accept a call message from an originating switch. The ISCP 650 receives and detects the caller/called telephone number pair, consistent with the ISUP format, and determines call connection and billing per the parameters loaded into the financed payment manager 600 for each financed subscriber.

Consequently, call handling for the inventive financed call payment feature need not utilize network "triggers" to initiate a call service nor hold an interactive setup communication with the calling party consistent with call control under TCAP.

The messaging link between the ISCP 650 and STP 211 may alternatively be based on the Transmission Control Protocol for compatibility with legacy equipment, in accordance with the principles of the present invention.

Although a POTS system is illustrated as a piece of terminating equipment, those skilled in the art will understand a telecommunication system may include other communication devices such as a Personal Communication System (PCS), private PBX, FAX and computer modems.

Moreover, while the embodiments of the present invention relate to the implementation of billing to a provisioned financier of a particular subscriber in calls with that financier in a prepaid application, the billing techniques and apparatus may equally be implemented in a post billing scenario, in accordance with the principles of the present invention.

While the invention has been described with reference to the exemplary embodiments thereof, those skilled in the art will be able to make various modifications to the described embodiments of the invention without departing from the true spirit and scope of the invention.

What is claimed is:

1. A database to allow a financing party to a phone call the automatic ability to pay charges of another party associated with said phone call, comprising:

a plurality of called financing party phone numbers each associated with a different financing party;

one or more calling financed party phone numbers associated with each of said plurality of called financing party phone numbers;

a plurality of direction parameters, at least one direction parameter associated with said one or more calling financed party phone number; and wherein call charges associated with a call between any one of said plurality of called financing party phone numbers and any of said one or more calling financed party phone numbers associated therewith are deducted from a prepaid account assigned to said one of said plurality of called financing party phone numbers based on said direction parameter associated with said one or more calling financed party phone number.

2. The database to allow a financing party to a phone call the automatic ability to pay charges of another party associated with said phone call according to claim 1, wherein said charges of said another party comprise:

airtime associated with said another party.

3. The database to allow a financing party to a phone call the automatic ability to pay charges of another party associated with said phone call according to claim 1, wherein said charges of said another party comprise:

roaming charges.

4. The database to allow a financing party to a phone call the automatic ability to pay charges of another party associated with said phone call according to claim 1, wherein said charges of said another party comprise:
  airtime charges of said another party;
  roaming charges of said another party; and
  applicable long distance toll charges associated with said call.

5. The database to allow a financing party to a phone call the automatic ability to pay charges of another party associated with said phone call according to claim 1, wherein:
  said phone numbers are mobile ID numbers.

6. The database to allow a financing party to a phone call the automatic ability to pay charges of another party associated with said phone call according to claim 1, wherein:
  a financed payment manager is within a prepaid application.

7. The database to allow a financing party to a phone call the automatic ability to pay charges of another party associated with said phone call according to claim 6, wherein:
  said prepaid application is operated within a service control point.

8. The database to allow a financing party to a phone call the automatic ability to pay charges of another party associated with said phone call according to claim 1, wherein:
  a financed payment manager is operated within a service control point.

9. The database to allow a financing party to a phone call the automatic ability to pay charges of another party associated with said phone call according to claim 1, wherein:
  said financed party phone numbers are associated with a wireless subscriber.

10. A database to allow a financing party to a phone call the automatic ability to pay charges of another party associated with said phone call, comprising:
  a plurality of financing party phone numbers each associated with a different financing party;
  one or more financed party phone numbers associated with each of said plurality of financing party phone numbers; and
  a phone call direction qualifier with respect to each of said one or more financed party phone numbers associated with each of said plurality of financing party phone numbers;
  wherein call charges associated with a call between any one of said plurality of financing party phone numbers and any of said one or more financed party phone numbers associated therewith are deducted from a prepaid account assigned to said one of said plurality of financing party phone numbers without requiring real time user input by said financed party.

11. The database to allow a financing party to a phone call the automatic ability to pay charges of another party associated with said phone call according to claim 10, wherein:
  said financed party phone numbers are associated with a wireless subscriber.

12. A method of allowing a called first party to a telephone call to pre-establish authorization for payment of charges associated with a calling second party to said telephone call, comprising:
  establishing a database associating said called first party, said calling second party and a direction parameter with respect to pre-established authorization for payment deducted from a prepaid account of said calling second party's call charges by said called first party; and
  automatically assigning said calling second party's call charges with respect to only said telephone call to said called first party after a call between said called first party and said calling second party has been terminated based on said direction parameter.

13. The method of allowing a called first party to a telephone call to pre-establish authorization for payment of charges associated with a calling second party to said telephone call according to claim 12, wherein:
  said assignment is a charge of costs associated with said calling second party for said telephone call to a prepaid account of said called first party.

14. The method of allowing a called first party to a telephone call to pre-establish authorization for payment of charges associated with a calling second party to said telephone call according to claim 13, wherein:
  said costs associated with said calling second party include air time of said calling second party.

15. The method of allowing a first party to a telephone call to pre-establish authorization for payment of charges associated with a second party to said telephone call according to claim 10, further comprising the step of:
  associating said second party's call charges with a wireless account.

16. A method of allowing a first party to a telephone call to pre-establish authorization for payment of charges associated with a second party to said telephone call comprising:
  establishing a database associating said first party, said second party, and a direction parameter with respect to pre-established authorization for payment of said second party's call charges by said first party; and
  automatically assigning said second party's call charges with respect to only said telephone call to said first party after a call between said first party and said second party has been terminated based on said direction parameter;
  wherein said assignment is a charge of costs associated with said second party for said telephone call to a prepaid account of said first party and said second party also maintains a prepaid account.

17. The method of allowing a first party to a telephone call to pre-establish authorization for payment of charges associated with a second party to said telephone call according to claim 16, further comprising the step of:
  associating said second party's call charges with a wireless account.

18. Apparatus for allowing a first party to a telephone call to pre-establish authorization for payment of charges associated with a second party to said telephone call, comprising:
  means for establishing a database associating said first party, said second party and a direction parameter with respect to pre-established authorization for payment deducted from a prepaid account of said second party's call charges by said first party; and
  means for automatically assigning said second party's call charges associated only with said telephone call to said first party after a call between said first party and said second party has been terminated based on said direction parameter.

19. The apparatus for allowing a first party to a telephone call to pre-establish authorization for payment of charges associated with a second party to said telephone call according to claim 18, wherein:
  said means for assigning charges costs associated with said second party to a prepaid account of said first party.

20. The apparatus for allowing a first party to a telephone call to pre-establish authorization for payment of charges associated with a second party to said telephone call according to claim 19 wherein:

said costs associated with said second party include air time of said second party.

21. The apparatus for allowing a first party to a telephone call to pre-establish authorization for payment of charges associated with a second party to said telephone call according to claim 18, further comprising:

means for associating said second party's call charges with a wireless account.

22. Apparatus for allowing a first party to a telephone call to pre-establish authorization for payment of charges associated with a second party to said telephone call, comprising:

means for establishing a database associating said first party, said second party and a direction parameter with respect to pre-established authorization for payment of said second party's call charges by said first party; and means for automatically assigning said second party's call charges associated only with said telephone call to said first party after a call between said first party and said second party has been terminated based on said direction parameter;

wherein said second party also maintains a prepaid account.

23. The apparatus for allowing a first party to a telephone call to pre-establish authorization for payment of charges associated with a second party to said telephone call according to claim 22, further comprising:

means for associating said second party's call charges with a wireless account.

24. A method for a telecommunication prepaid application to bill another party for wireless telephone call charges, comprising:

storing a Mobile Identification Number as a prepaid wireless subscriber;

establishing an account for a financing party in a financing party payment database;

routing a prepaid wireless subscriber's call to a prepaid application;

determine if said prepaid wireless subscriber is valid;

terminating said prepaid wireless subscriber's call if said prepaid wireless subscriber is not valid, or if said prepaid wireless subscriber is valid, confirming said prepaid wireless subscriber's call is applicable for a financing party payment service in accordance with said established financing party payment database;

re-routing said wireless subscriber's call if said call is not applicable for said financing party payment service;

verifying that said financing party has pre-payment sufficient to pay charges of said prepaid wireless subscriber associated with said prepaid wireless subscriber's call;

terminating said prepaid wireless subscriber's call if said financing party's prepaid account does not have sufficient pre-payment, or connecting said call if said financing party's prepaid account does have sufficient pre-payment; and billing said prepaid wireless subscriber's call charges to said financing party's prepaid account.

25. The method for a telecommunication prepaid application to bill another party for wireless telephone call charges according to claim 24, comprising:

said storing, establishing, routing, re-routing, verifying and billing is performed in an Advanced Intelligent Network.

26. The method for a telecommunication prepaid application to bill another party for wireless telephone call charges according to claim 24, wherein:

said confirming that said prepaid wireless subscriber's call is applicable for a financing party payment service does not require an interactive communication procedure with said prepaid wireless subscriber.

* * * * *

UNITED STATES PATENT AND TRADEMARK OFFICE
CERTIFICATE OF CORRECTION

PATENT NO. : 6,788,927 B2  Page 1 of 1
APPLICATION NO. : 10/253704
DATED : September 7, 2004
INVENTOR(S) : Pohutsky et al.

It is certified that error appears in the above-identified patent and that said Letters Patent is hereby corrected as shown below:

Insert on The Title Page:

Related U.S. Application Data

Item (60) U.S. Application No. 09/988,186, filed on November 19, 2001.

Signed and Sealed this

Seventeenth Day of April, 2007

JON W. DUDAS
*Director of the United States Patent and Trademark Office*